(12) United States Patent
Krize et al.

(10) Patent No.: US 10,411,401 B1
(45) Date of Patent: Sep. 10, 2019

(54) ELECTRICAL JUNCTION RECEPTACLE FOR MAGNETIC ELECTRICAL CONNECTORS

(71) Applicant: Christmas Northeast, Inc., Trumbull, CT (US)

(72) Inventors: Anthony Krize, Huntersville, NC (US); Matthew Ryder, Attleboro, MA (US)

(73) Assignee: Christmas Northeast, Inc., Trumbull, CT (US)

( * ) Notice: Subject to any disclaimer, the term of this patent is extended or adjusted under 35 U.S.C. 154(b) by 0 days.

(21) Appl. No.: 16/375,212

(22) Filed: Apr. 4, 2019

Related U.S. Application Data (63) Continuation-in-part of application No. 16/264,016, filed on Jan. 31, 2019, which is a continuation-in-part of application No. 16/108,642, filed on Aug. 22, 2018, now Pat. No. 10,236,627.

(60) Provisional application No. 62/679,088, filed on Jun. 1, 2018.

(51) Int. Cl.
| | |
|---|---|
| *H01R 13/62* | (2006.01) |
| *H02G 3/12* | (2006.01) |
| *H01H 1/58* | (2006.01) |
| *H01R 24/76* | (2011.01) |
| *G06F 1/18* | (2006.01) |
| *H01R 13/652* | (2006.01) |
| *H01R 13/24* | (2006.01) |

(52) U.S. Cl.
CPC .......... *H01R 13/6205* (2013.01); *G06F 1/18* (2013.01); *H01H 1/58* (2013.01); *H01R 13/24* (2013.01); *H01R 13/652* (2013.01); *H01R 24/76* (2013.01); *H02G 3/123* (2013.01)

(58) Field of Classification Search
CPC .................................................. H01R 13/6205
See application file for complete search history.

(56) References Cited

U.S. PATENT DOCUMENTS

| | | | |
|---|---|---|---|
| 6,309,248 B1 * | 10/2001 | King | H01R 13/7135 439/535 |
| 7,273,392 B2 * | 9/2007 | Fields | H01R 25/00 174/53 |
| 8,794,980 B2 | 8/2014 | McCormack | |
| 8,936,472 B1 | 1/2015 | Gibboney, Jr. | |
| 9,418,802 B2 | 8/2016 | Romano et al. | |
| 9,614,322 B1 | 4/2017 | Gibboney, Jr. | |
| 9,899,813 B1 | 2/2018 | Gibboney, Jr. | |
| 10,014,624 B2 | 7/2018 | Chun | |
| 2005/0272305 A1 * | 12/2005 | Gorman | H01R 13/447 439/536 |

(Continued)

*Primary Examiner* — Tho D Ta
(74) *Attorney, Agent, or Firm* — Nexsen Pruet, LLC; Michael A. Mann (57) ABSTRACT

A device for interconnecting electrical wiring or for accessing electrical current carried by electrical wiring includes an electrical junction housing for receiving an electrical cable, an inner housing inserted into the junction housing to connect the individual wires of the incoming electrical cable to a first magnetic electrical connector carried by the inner housing. A physical interface device such as a switch or a wall socket is then wired to a second magnetic electrical connector that can be plugged into the electrical junction housing. The two magnetic electrical connectors, when joined in the correct orientation, pass electrical current.

13 Claims, 6 Drawing Sheets

(56) References Cited

U.S. PATENT DOCUMENTS

2014/0113461 A1* 4/2014 Kim .................. H01R 13/6205
439/39

* cited by examiner

ELECTRICAL JUNCTION RECEPTACLE FOR MAGNETIC ELECTRICAL CONNECTORS

TECHNOLOGICAL FIELD

The present disclosure relates to devices for connecting electrical conductors for the distribution of electrical current, and, more particularly, to the electrical junction receptacles that connect electrical conductors to control devices such as switches and wall sockets.

BACKGROUND

Electrical wiring in a home, apartment, office, store or other building provides electricity for lighting, appliances, heating and air conditioning, and other devices that make the building more comfortable, safer, cleaner, and more enjoyable for those who are in the building. Electrical wiring carries an electrical current from one place to another to provide power to and to interconnect with devices that use electrical power.

Electrical wiring comprises electrical conductors, usually more than one electrical conductor, and which electrical conductors may be covered by an electrically insulating material. For example, electrical wiring may comprise three electrical conductors: a positive conductor, a negative conductor and a ground wire. The positive and negative conductors are insulated or electrically separated from each other and may be connected to a source of electrical current or to a load that requires the electrical current for its operation.

Electrical wiring may also be connected to other electrical wiring at an electrical junction receptacle having to a user control device. An electrical junction receptacle is a housing that permits electrical wiring to be connected to other electrical wiring or to a user control device, such as an electrical switch to activate or deactivate an electrical device, or to an electrical socket for receiving an electrical plug from an appliance so the appliance can be operated. An electrical junction receptacle is therefore simply a device for joining two or more wires together—essentially for establishing a physical user interface—the switch or the socket, for example—to provide the user with control of or access to electrical current.

The network of wires and electrical junction receptacles, even in a modest home, may be extensive, and much more so in a modern office building that may also include extensive workplace lighting, automatic climate features and security features, or in a factory that may have multiple levels of electrical current and current frequencies for operating machinery and for providing electricity for office use.

Whether in a home or in a factory, care must be taken to connect electrical wiring. Accordingly, trained electricians are required for installing the electrical junction receptacles, for running cables to their various destinations, and for connecting wires and cables according to the architectural plans.

A way to simplify the wiring process and decrease the likelihood of mis-wiring a wiring system would be an advantage.

SUMMARY

According to its major aspects and briefly recited, the present device is an electrical junction receptacle for use in a wiring system where light switches and electrical socket or other, similar physical user interface devices for accessing and controlling electrical currents are connected to electrical wiring.

The present electrical junction receptacle uses magnetic electrical connectors to simplify the connection of the incoming electrical cables to the physical user interface devices. Instead of connecting the electrical wiring of the incoming cable directly to a particular physical user interface device—such as a light switch or wall socket—the physical user interface device and the incoming electrical wiring are connected to separate magnetic electrical connectors. When the two magnetic electrical connectors are pushed together in the correct orientation, the wiring connections are complete.

Magnetic electrical connectors of the type used herein are also described in commonly-owned, pending, U.S. patent application Ser. No. 16/108,642; 16/205,961; 16/214,969; and Ser. No. 16/264,016.

The addition of two magnetic electrical connectors, one to an inner housing that fits into a junction housing and the other one fitting onto an interface housing, enables the individual housing components to be manufactured as pre-wired components. Accordingly, the electrician needs only to push the interface housing into the junction housing in the correct orientation. The right orientation is self-evident by visual inspection. If the interface housing is pushed into the junction housing in the wrong orientation, the device fails safely: it simply does not work. Also, replacing a switch or outlet is just as simple—the defective junction housing is simply pulled from the electrical junction receptacle and a new one inserted in the right orientation.

Establishing wiring in a building requires foresight and planning. However, even with ample foresight and careful planning, plans change. An improvement in the process or equipment used in wiring a building that makes re-wiring easier or more flexible would be an advantage. Whether in installation or in renovation or just in replacement, physically attaching the wires and detaching the wires becomes unnecessary with the present electrical junction receptacles, which is an aspect of the present disclosure.

Moreover, the orientation of the magnetic electrical connectors, as will be described herein, assures that the arrangement of the positive and negative wires with respect to each other and to ground is fixed so that mistakes in attaching electrical wiring are much less likely to occur, which is another aspect of the present disclosure.

Those skilled in electrical wiring in residences, commercial buildings and industrial buildings will recognize other features and their advantages in the present electrical junction receptacles from a careful reading of the following detailed description, accompanied by the drawings.

BRIEF DESCRIPTION OF THE DRAWINGS

In the figures.

DETAILED DESCRIPTION

The present invention is an improved electrical junction receptacle 10 that has additional structure in its interior for reducing installation time and installation errors. The additional structure is inserted during manufacturing of the components of electrical junction receptacle 10 in order to avoid the need to manually connect the wires in a junction box directly to a physical electrical interface, such as a wall socket or light switch. Instead of manual connections of the wires, magnetic electrical connectors are used so that wired electrical connections can be minimized leaving connections to be made more simply and without error by pushing the magnetic electrical connectors together at the job site.

Referring now to the figures, the electrical junction receptacle 10 is illustrated in two embodiments. A first embodiment is shown in FIGS. 1-5 and shows a double wall socket 14, that is, with two electrical plugs 190, 194, which are shown inserted into wall socket 14 in FIG. 5. A second embodiment is shown in FIG. 6, showing a light switch 18 instead of double wall socket 14. Double wall socket 14 and light switch 18 are examples of a "physical user interface" with electricity.

Physical user interfaces, as used herein, enable the user to control an electrical wiring system, such as those found in homes, office buildings, commercial buildings, manufacturing plants, warehouses, and any other structure that has a system of wires for providing electricity. An examples of a physical user interface other than light switch 18, as shown in FIG. 6, include a contact button, a voice-activated control, a mobile device with wireless connection, a light level sensor and a timer that activates lighting. Similarly, an example of a physical user interface other than a double wall socket 14 (two sockets to be mounted as a pair to a wall) may be a universal service bus (USB) port, for example.

An electrical junction receptacle 10 is a structure that receives a cable 34 that is part of a wiring system. Cable 34 is connected indirectly to double wall socket 14 (as seen in FIGS. 1-5) or to a light switch 18 (as seen in FIG. 6). In prior art devices, a cable entering an electrical junction receptacle is connected directly to a double wall socket 14 or directly to a light switch 18 by securing the ends of the wires carried in cable 34 to posts on double wall socket 14 or light switch 18.

Electrical junction receptacle 10 includes a junction housing 22, an interface housing 26, and an inner housing 30. Interface housing 26 holds the physical user interface—namely, and as shown herein, double wall switch 14 (FIGS. 1-5) or light switch 18 (FIG. 6). Inner housing 30 fits inside junction housing 22. Interface housing 26, also fits inside junction housing 22 in front of inner housing 30 as inserted. Junction housing 22 is oriented so that double wall socket 14 (FIGS. 1-5) or light switch 18 (FIG. 6) (or other physical user interface) is accessible from outside of electrical junction receptacle 10.

Junction housing 22 receives cable 34 into its interior via a hole 62. Inner housing 30 has slot 66 formed therein, which straddles hole 62 and cable 34 as inner housing 30 is inserted into position in junction housing 22.

Figure 5:
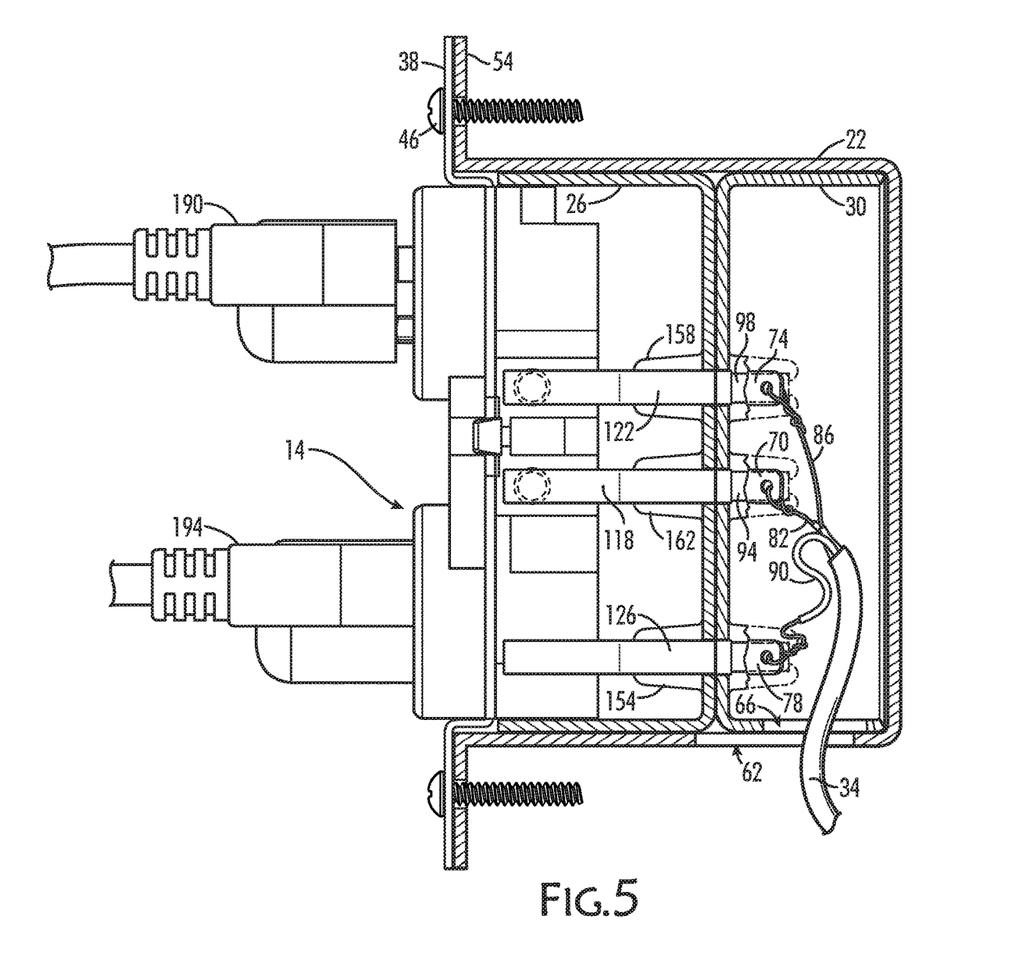
FIG. 5 is a right side, cross-sectional view of the electrical junction receptacle of FIG. 1 for two electrical sockets, showing two plugs, one in each socket and the two magnetic electrical connectors inside the electrical junction receptacle.
Figure 6:
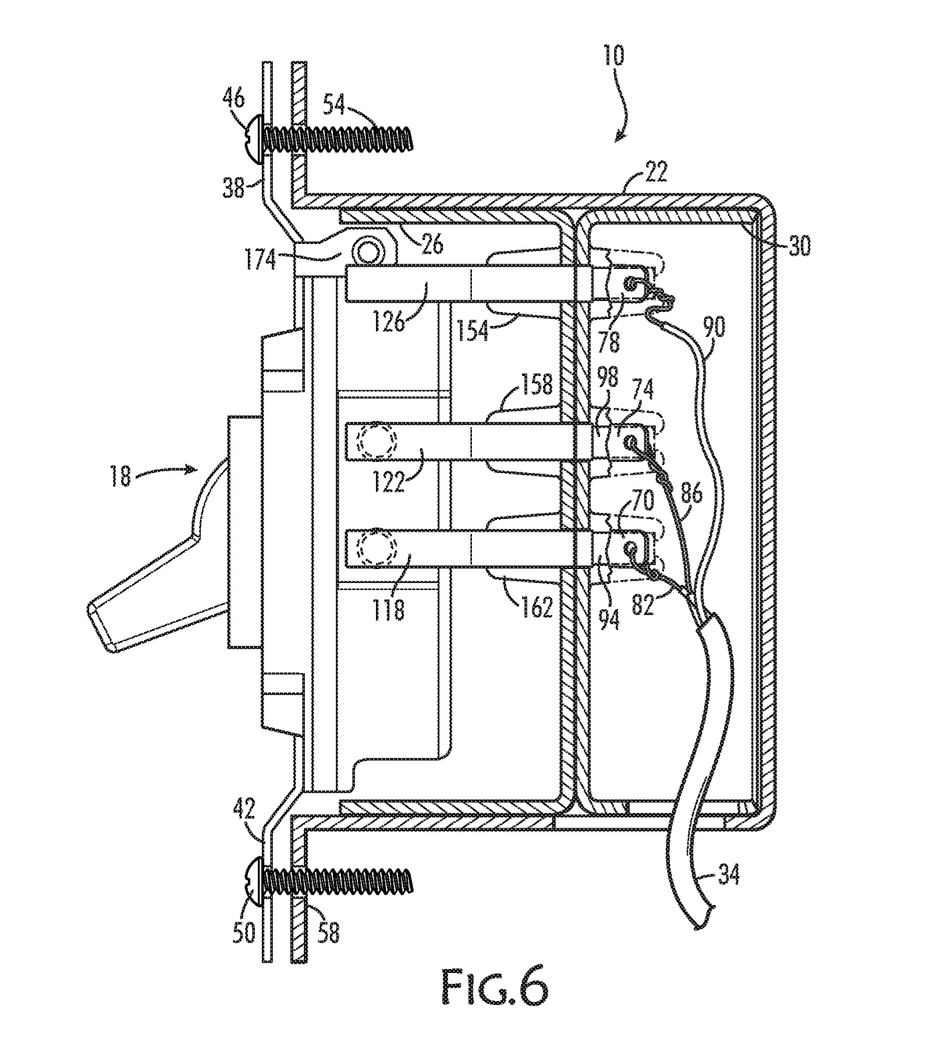
FIG. 6 is a right side, cross-sectional view of the electrical junction receptacle for a light switch, showing the light switch and three magnetic electrical connectors inside the electrical junction receptacle.

As best seen in FIGS. 5 and 6, inner housing 30 and interface housing 26 face each other, and, as will be explained in detail below, both have holes that correspond to each other. These holes enable electrical terminals to be brought into contact with each other to pass the electrical current. The terminals are pressed against each other by the magnetic force exerted by magnets opposing each other with the conductive terminals between them.

Keepers are fixed in place lateral to the magnets to hold them near the terminals. Keepers also to allow room for the magnets to move toward an opposing magnet when its polarity is opposite, and to move slightly away from the other magnet when the magnet's polarity is the same, such as might occur when the interface housing 26 is not properly oriented upon insertion into junction housing 22.

Figure 1:
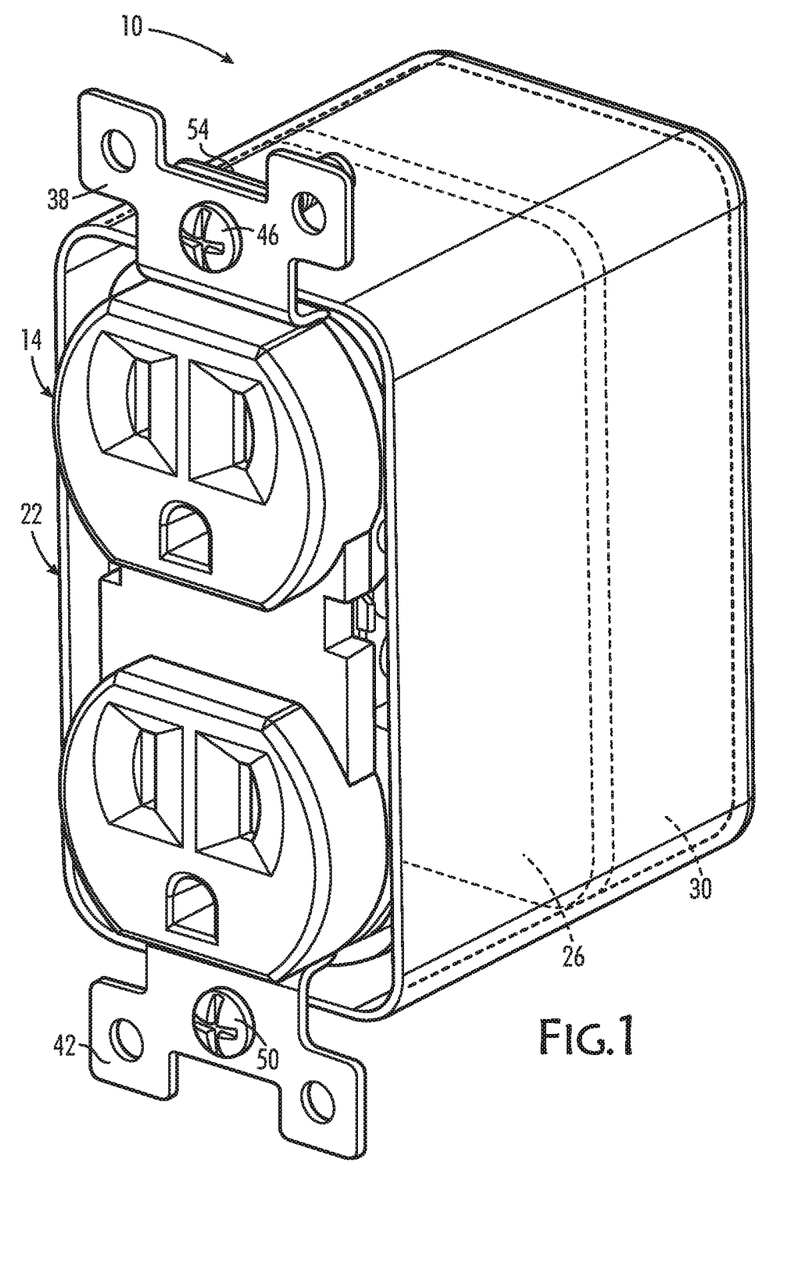
FIG. 1 is a right, upper, perspective view of an electrical junction receptacle with a dual electrical socket according to an aspect of the disclosure.
Figure 2:
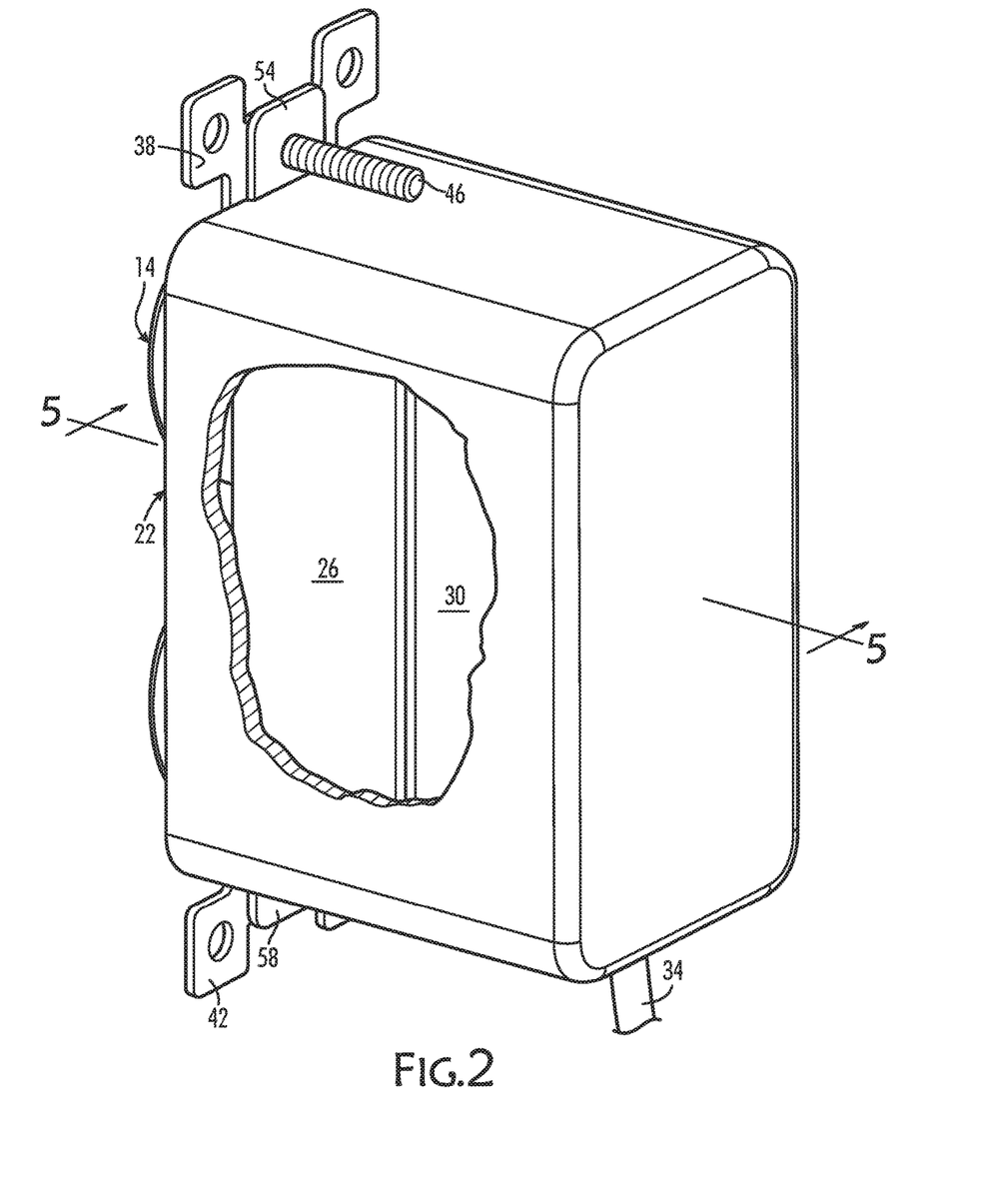
FIG. 2 is side, rear perspective and partially cutaway view of the electrical junction receptacle of FIG. 1, according to an aspect of the disclosure.
Figure 3:
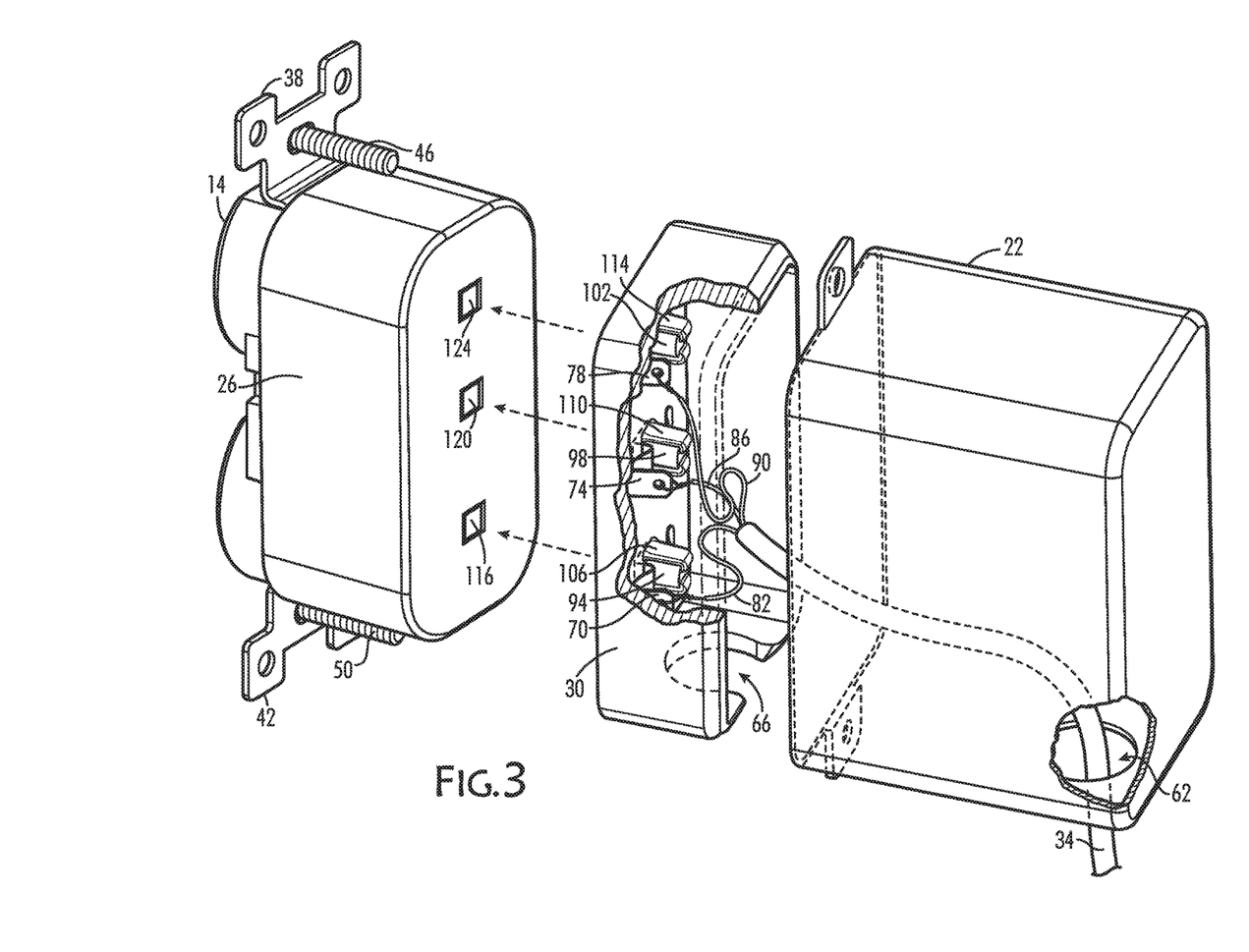
FIG. 3 shows a side, rear, partially cutaway, and exploded view the electrical junction receptacle of FIG. 2, showing the connection of the incoming cable's electrical wiring connected to magnetic electrical connector terminals, and the magnetic electrical connector terminals for the wall socket, according to an aspect of the disclosure.
Figure 4:
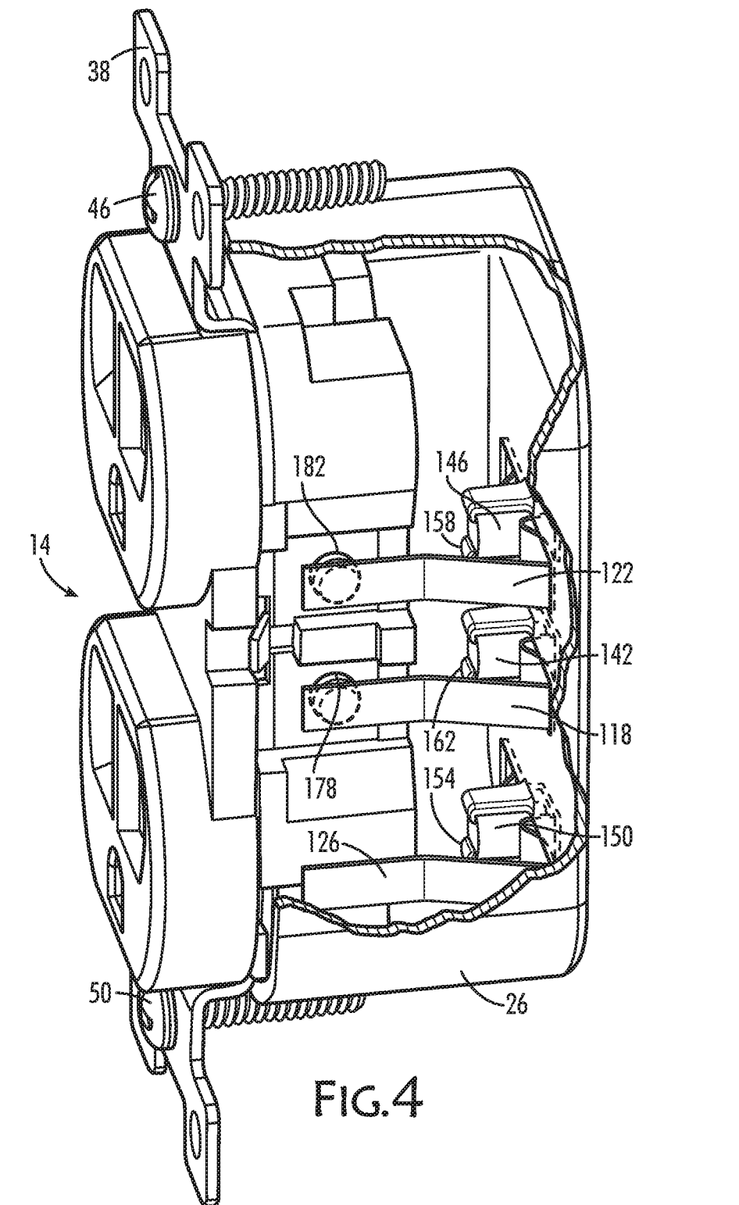
FIG. 4 is a left side, upper, partially cutaway, perspective view of the wall sockets and their wiring connections to the second magnetic electrical connector, according to an aspect of the disclosure.

Referring now to FIG. 3, inner housing 30 may have a first terminal 70, a second terminal 74 and a third terminal 78. Cable 34 may have three electrical conductors in it, namely, a first electrical conductor 82, a second electrical conductor 86, and a third electrical conductor 90. First terminal 70 may be arbitrarily designated as electrically positive with respect to second terminal 74 and connected to first electrical conductor 82. Second terminal 74 is then arbitrarily electrically negative and connected to second electrical conductor 86. Third terminal 78 is neutral and connected to third electrical conductor 90, which serves as an electrical ground.

A first magnet 94 is proximate to a first terminal 70; a second magnet 98 is proximate to second terminal 74; and a third magnet 102 is proximate to third terminal 78. Helping to keep first magnet 94, second magnet 98, and third magnet 102 near first terminal 70, second terminal 74, and third terminal 78, respectively, are first keepers 106, second keepers 110, and third keepers, 114, respectively. First keepers 106, second keepers 110, and third keepers 114 permit only limited movement of their respective magnets so they can maintain the general positions, respectively, of first magnet 94, second magnet 98, and third magnet 102 but still allow them to make small movements, namely, those movements that permit the flow of current across first terminal 70, second terminal 74 and third terminal 78, respectively, and only when junction housing 22 is fully inserted in the proper orientation.

Interface housing 26, as with inner housing 30, has the same arrangement of terminals, magnets and keepers but is oriented to face inner housing 30.

Interface housing 26 has a fourth hole 116, a fifth hole 120, and a sixth hole 124. At fourth hole 116 is a fourth terminal 118. A fifth terminal 122 is a fifth hole 120. A sixth terminal 126 is at sixth hole 124.

Completing the symmetry across interface housing 26 (see FIG. 5) and inner housing 30, a fourth magnet 142 held by a fourth keeper 154 braces fourth terminal 118; a fifth magnet 146 held by a fifth keeper 158 braces a fifth terminal 122; and a sixth magnet 150 held by a sixth keeper 162 braces a sixth terminal 126.

Fourth terminal 118, fifth terminal 122, and sixth terminal 126 are also connected to the physical interface device, that is, to double wall socket 14 as shown in FIG. 5 and to light switch 18, as shown in FIG. 6. Fourth terminal 118 is attached to a first socket connection 166. Second terminal 122 is attached to a second socket connection 170. Third terminal 126 is attached to a metal surface 174 of dual wall socket 14 or of light switch 18 for a neutral ground.

Those skilled in electrical wiring systems will appreciate that many modifications and substitutions may be made in the foregoing description without departing from the spirit and scope of the disclosure.

What is claimed is:

1. An electrical junction receptacle, comprising:
   (a) an inner housing having a first wall, said first wall formed to have a first hole, a second hole and a third hole therein;
   (b) a first magnetic electrical terminal at said first hole of said first wall, said first magnetic electrical terminal having
      a first terminal at said first hole,
      a first magnet, and
      a first keeper, said first keeper holding said first magnet against said first terminal at said first hole; and
   (c) a second magnetic electrical terminal at said second hole of said first wall, said second magnetic electrical terminal having
      a second terminal at said second hole,
      a second magnet, and
      a second keeper, said second keeper holding said second magnet against said second terminal at said second hole; and
   (d) an interface housing having a second wall facing said first wall, said second wall formed to have a fourth hole, a fifth hole, and a sixth hole therein;
   (e) a fourth magnetic electrical terminal at said fourth hole of said second wall, said fourth magnetic electrical terminal facing said first magnetic electrical terminal, said fourth magnetic electrical terminal having
      a fourth terminal at said fourth hole,
      a fourth magnet,
      a fourth keeper, said fourth keeper holding said fourth magnet against said fourth terminal at said fourth hole, and
   (f) a fifth magnetic electrical terminal at said fifth hole of said second wall, said fifth electrical terminal facing said second magnetic electrical terminal, said fifth magnetic electrical terminal having
      a fifth terminal at said fifth hole,
      a fifth magnet, and
      a fifth keeper, said fifth keeper holding said fifth magnet against said fifth terminal at said fifth hole; and
   (g) an electrical cable having a first electrical conductor and a second electrical conductor, said first electrical conductor connected to said first terminal of said first magnetic electrical terminal, and said second electrical conductor being connected to said second terminal of said second magnetic electrical terminal.

2. The electrical junction receptacle of claim 1, further comprising a switch in said interface housing, said switch connected electrically with said fourth terminal and said fifth terminal.

3. The electrical junction receptacle of claim 1, further comprising a socket in said interface housing, said socket connected to said fourth terminal and said fifth terminal.

4. The electrical junction receptacle of claim 1, wherein said interface housing is formed to have a sixth hole and wherein said interface housing further comprises a sixth magnet, a sixth terminal and a sixth keeper, said third keeper configured to hold said sixth magnet against said sixth terminal at said sixth hole.

5. The electrical junction receptacle of claim 4, wherein said sixth hole of said interface housing is spaced farther apart from said fifth hole of said interface housing than said fifth hole of said interface housing is spaced from said fourth hole of said interface housing.

6. The electrical junction receptacle of claim 1, wherein said first magnet has a first north face and a first south face, and wherein said first north face of said first magnet faces said first hole.

7. The electrical junction receptacle of claim 6, wherein said second magnet has a second north face and a second south face and wherein said second south face of said second magnet faces said second hole.

8. The electrical junction receptacle of claim 1, further comprising:
   a junction housing dimensioned to receive said interface housing therein, and wherein said electrical cable is in said junction housing,
      wherein said first electrical conductor of said electrical cable is connected to said first terminal and said second electrical conductor of said electrical cable is connected to said second terminal.

9. The electrical junction receptacle of claim 8, wherein said first electrical conductor is attached to a positive voltage and said second electrical conductor is attached to a negative voltage.

10. The electrical junction receptacle of claim 9, further comprising a third electrical conductor which serves as an electrical ground.

11. The electrical junction receptacle of claim 10, wherein said first wall includes a third hole, said second wall includes a sixth hole, and wherein said electrical junction receptacle further comprises:
   (a) a third terminal at said third hole of said first wall;
   (b) a sixth terminal at said sixth hole of said second wall;
   (c) a third magnet at said third terminal;
   (d) a sixth magnet at said sixth terminal,
   (e) a third keeper at said third magnet; and
   (f) a sixth keeper at said sixth magnet, wherein said third electrical ground conductor is connected to said third terminal at said third hole, and said third magnet is oriented to attract said sixth magnet whereby said third terminal and said sixth terminals are pressed together between said third magnet and said sixth magnet.

12. The electrical junction receptacle of claim 11, further comprising a second electrical ground conductor connected to said sixth terminal.

13. The electrical junction receptacle of claim 12, wherein said second electrical ground conductor is connected to a switch or an electrical socket.

* * * * *